April 7, 1925.
W. C. RICE
BUMPER FOR VEHICLES
Filed Sept. 24, 1924
1,532,661
2 Sheets-Sheet 1
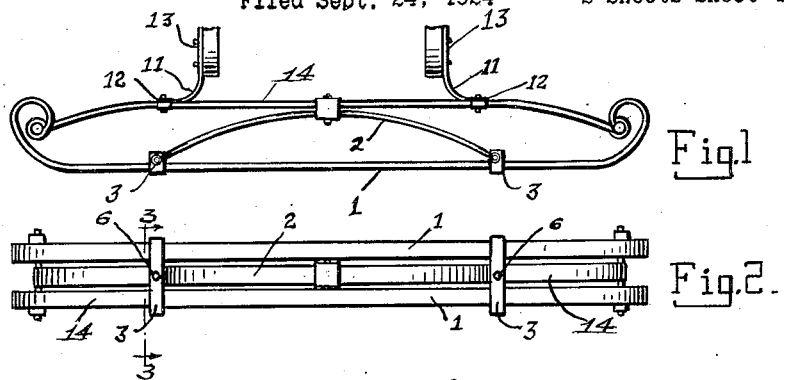
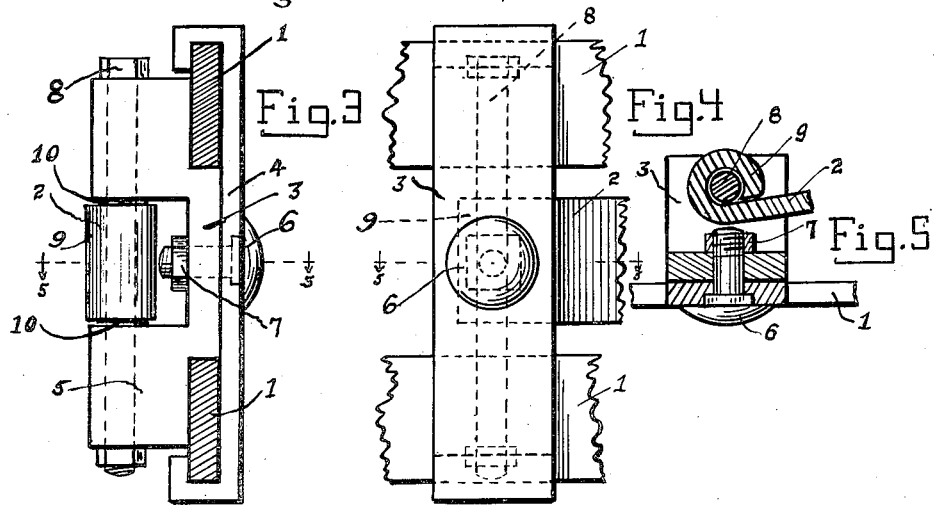
Inventor
William Cyrus Rice Patented Apr. 7, 1925.

1,532,661

UNITED STATES PATENT OFFICE.

WILLIAM CYRUS RICE, OF GRAND RAPIDS, MICHIGAN.

BUMPER FOR VEHICLES.

Application filed September 24, 1924. Serial No. 739,577.

*To all whom it may concern:*

Be it known that I, WILLIAM CYRUS RICE, a citizen of the United States, residing at Grand Rapids, in the county of Kent and State of Michigan, have invented new and useful Improvements in Bumpers for Vehicles, of which the following is a specification.

The present invention relates to bumpers for vehicles such as automobiles; and its object is, generally, to provide an improved bumper having forward and rearward portions or members, which are of resilient spring metal, whereby vehicles equipped with such bumpers may be better protected from injury arising from collisions with moving or stationary objects; and further, to provide such a bumper so constructed that permanent distortion will not as readily result from severe impacts with such objects; and further, to provide such a bumper whereby the force of any impact may be more evenly distributed and resiliently resisted throughout the entire bumper, thereby increasing the cushioning efficiency of the bumper; and further, to provide means wherewith nearly all of the now known spring metal type bumpers may be manufactured or equipped to accomplish the various objects set forth in this specification; and further, to provide such a bumper having a plurality of forward or impact portions or members which more perfectly co-act in cushioning impacts received by either of them; and further and more particularly, to provide such a bumper whose said portions or members are so connected at a point or points in their lengths that their interrelative swinging movement is permitted; and further, to provide means whereby such portions or members in their said interrelative swinging movement may automatically tend to assume a parallel relationship, thereby augmenting the cushioning efficiency when one or another of said portions is flexed by such impacts.

The objects of this invention heretofore enumerated are accomplished by partially overcoming a defect which has hitherto existed in spring metal type bumpers. This deficiency exists because of the fact that the portions or members of present bumpers are so rigidly connected at a point or points in their lengths that the force of an impact against one portion or member expends itself principally between such rigid connections, only a small fraction of the force of such impact being absorbed and cushioned by those parts which are remote from such rigid connections. By providing, as I have done, that the impact portions or members of the bumper may swing interrelatively with the other portions or members of the bumper, the above referred to defect is largely overcome and the bumper's efficiency increased thereby.

These and any other objects hereinafter appearing are attained by, and the invention finds preferable embodiment in the structure or structures hereinafter particularly described in the body of this specification and illustrated in the accompanying drawings, in which:—

Figure 1 is a top plan view of one form of my bumper;

Figure 2 is a front elevation of the same;

Figure 3 is a cross-sectional view of the same taken on line 3—3 of Figure 2;

Figure 4 is a front elevation of the parts seen in Figure 3;

Figure 5 is a sectional view of certain parts of Figure 3 and Figure 4 taken on lines 5—5 of Figure 3 and Figure 4;

Figures 6, 7 and 8 are modified constructions of the parts shown in Figures 3, 4 and 5 respectively and are adapted to be used where the forward or rearward portion or member of the bumper is connected to the other portion or member at some point other than its extremity (as in a bumper of the character illustrated in Figures 11 and 12); and Figures 9 to 15, both inclusive, are top plan diagrammatic views of some of the many types of bumpers wherein my invention may be embodied, the positions of the portions or members thereof, when flexed under the force of an impact at various points indicated by small arrows, being shown in dotted lines.

In the views, various forms of bumpers are illustrated, each comprising forward and rearward portions 1, 2 respectively. In all the views, the forward portion or portions are interrelatively swingable with the rearward portion or portions by reason of the pintle connection connecting them, and under the flexing movement resulting from the force of an impact the forward and rearward portions or members automatically swing interrelatively with each other. Various means for thus connecting these portions or members to permit such interrelative swingable movement are shown. The connecting member, designated generally 3, shown in Figures 3, 4 and 5 is adapted to be used for bumpers of the character shown in Figures 1 and 2 (double impact bars). The forward portions 1, 1 are clamped between the parts 4, 5 by means of the threaded bolt 6 and the nut 7, the part 5 carrying a pintle 8. The rear portion or member 2 is bent to form an eye 9, 9 at its extremities through which the pintle 8 is adapted to be inserted. The bumper shown in Figures 1, 2 and 9 also comprises a third member 2 which in these views is resilient, although it may be rigid.

The connecting member shown in Figures 6, 7 and 8 is of a construction similar to that illustrated in Figures 3, 4 and 5 respectively and is adapted to be used in bumpers of the character illustrated in Figures 11 and 12, in which the rearward portion or member is connected to the forward portion or member at a point other than its extremities. The forward portions 1, 1 are clamped between the parts 4², 5² of the connecting member 3² in the same manner as described for the connecting member shown in Figures 3, 4 and 5. But the rear portion or member 2 is rigidly connected to the part 2¹ by the pin 2², the part 2¹ being swingably carried by the pintle 8².

In bumpers having a pair of vertically spaced horizontally disposed forward or impact portions or members, the force of an impact on either one of the pair will necessarily be transmitted to the other by reason of the construction of the connecting members.

In the diagrammatic views—Figures 9 to 15, both inclusive—the normal shape of various forms of bumpers capable of utilizing the principles of this invention (it being obvious that many other types may use it) are shown in top plan; and the positions of the parts thereof when flexed by the force of an impact at places indicated by small arrows, are shown in dotted lines; from which it will be clear that by reason of the interrelative-swingable movement of the forward and rearward portions or members under flexing movement, the cushioning effect of the bumper in resiliently resisting such impacts is utilized in a marked degree by distributing the force of such impacts throughout the entire bumper.

The bumper shown in Figure 15 is adapted to be attached to the rear of the vehicle. The invention claimed and described in this application is well adapted for utilization in this type of bumper, for in bumpers of this character, the forward or impact portions or members are necessarily short, and although inherently resilient, are practically rigid and are shock transmitters rather than shock absorbers because of their short length.

Spring washers 10, to prevent rattling, may be used in the connecting members where the rear portions or members are connected.

In the views the portions or members 1, 2 are integrally formed at their ends, as shown in Figure 12, or connected at their ends by pintles as seen in Figures 1, 9, 11, 13 and 14. It will be understood that the bumpers may be attached to the vehicle in any convenient and well-known manner, as by the attaching means 11, clamped to the bumper at one end by clamps 12, and to the chassis of the vehicle by bolts 13.

It will be seen that, by reason of the swinging connection of the two members or portions of my bumper, the force of an impact received by the impact portion or member 1 is initially borne by it and secondarily by the rear member or portion 2, being thus shared between them in a manner that peculiarly well prevents a permanent distortion of the bumper or any part thereof.

The invention being intended to be pointed out in the claims, is not to be limited to or by details of construction of the particular embodiments thereof illustrated by the drawings or hereinbefore described.

I claim:

1. A bumper for vehicles comprising: forward and rearward resilient portions extending transversely of the vehicle and interrelatively hingedly connected at a point intermediate the ends of one of said portions.

2. A bumper for vehicles comprising: forward and rearward resilient portions extending transversely of the vehicle; a bearing intermediate the ends of one of said portions in which bearing one of said portions is adapted to swing interrelatively with the other of said portions.

3. A bumper for vehicles comprising: forward and rearward resilient portions extending transversely of the vehicle and connected interrelatively hingedly intermediate the ends of the forward portion.

4. A bumper for vehicles comprising: forward and rearward resilient portions extending transversely of the vehicle connected at a point intermediate the ends of one of them to permit interrelative swingable movement.

5. A bumper for vehicles comprising: forward and rearward resilient portions extending transversely of the vehicle; a connecting member therefor having hinged means for carrying the respective portions and connecting the said portions at a point intermediate the ends of one of said portions.

6. A bumper for vehicles comprising: forward and rearward resilient portions extending transversely of the vehicle; a member for connecting said portions intermediate the ends of one of said portions; means for hingedly connecting one of said portions to said member; means for connecting the other of said portions to said member.

7. A bumper for vehicles comprising: forward and rearward resilient portions extending transversely of the vehicle; a connecting member therefor intermediate the ends of one of said portions and comprising a part having spaced ears and a pintle extending therebetween, and also comprising a clamp member for clamping one of said portions to said part, the other of said portions being hingedly mounted on the pintle between the ears.

8. A bumper for vehicles comprising: a pair of resilient vertically spaced, horizontally disposed forward members; a rearward horizontally disposed member pivotally connected at its ends interjacent the ends of the forward members and hingedly connected at the approximate center of the forward members interjacent the same.

In testimony whereof I have hereunto set my hand at Grand Rapids, Michigan, this 22nd day of September, 1924.

WILLIAM CYRUS RICE.